(12) United States Patent
Ousley et al.

(10) Patent No.: US 9,094,739 B2
(45) Date of Patent: Jul. 28, 2015

(54) INTERNET PROTOCOL SWITCHING SYSTEM AND ASSOCIATED METHOD OF USE

(71) Applicant: MicroTechnologies LLC, Vienna, VA (US)

(72) Inventors: Jeremy Edward Ousley, Greensboro, NC (US); Bobbie Harman, Colfax, NC (US); Joseph Frederick Staehly, Liberty, NC (US)

(73) Assignee: Unicorn Government, Inc., Herndon, VA (US)

( * ) Notice: Subject to any disclaimer, the term of this patent is extended or adjusted under 35 U.S.C. 154(b) by 266 days.

(21) Appl. No.: 13/665,544

(22) Filed: Oct. 31, 2012

(65) Prior Publication Data

US 2014/0119727 A1 May 1, 2014

(51) Int. Cl.
*H04Q 11/00* (2006.01)

(52) U.S. Cl.
CPC .................. *H04Q 11/0005* (2013.01)

(58) Field of Classification Search
CPC .................................. H04Q 11/0005
See application file for complete search history.

(56) References Cited

U.S. PATENT DOCUMENTS

| | | | |
|---|---|---|---|
| 5,434,920 A | 7/1995 | Cox et al. | |
| 7,283,743 B2 | 10/2007 | Matz et al. | |
| 7,477,614 B2 | 1/2009 | Hansen | |
| 7,533,259 B2 | 5/2009 | Anspach | |
| 7,623,149 B2 | 11/2009 | Winegard | |
| 8,027,473 B2 | 9/2011 | Stiscia et al. | |
| 8,432,835 B1* | 4/2013 | Dirks et al. | 370/264 |
| 2002/0031126 A1 | 3/2002 | Crichton et al. | |
| 2004/0068655 A1 | 4/2004 | Nishimura et al. | |
| 2005/0243742 A1 | 11/2005 | Hansen | |
| 2006/0109982 A1 | 5/2006 | Puiatti et al. | |
| 2007/0124821 A1 | 5/2007 | Saito | |
| 2008/0022120 A1 | 1/2008 | Factor et al. | |
| 2008/0095079 A1 | 4/2008 | Barkley et al. | |
| 2008/0310436 A1 | 12/2008 | Bareis | |

(Continued)

OTHER PUBLICATIONS

Pan et al., "Advanced Optical-Label Routing System Supporting Multicast, Optical TTL, and Multimedia Applications", Journal of Lightwave Technology, 2005, vol. 23, No. 10, Retrieved from Internet: http://sierra.ece.ucdavis.edu/Papers/2005/Zhong_Pan_JLT_2005_OLS.pdf.

(Continued)

*Primary Examiner* — Leslie Pascal
(74) *Attorney, Agent, or Firm* — Thompson Coburn LLP

(57) ABSTRACT

An IP switching system that includes a coder/decoder configured for converting voice between analog and digital; and a first switch coupled to the coder/decoder configured to isolate non-secure entities in a network and comprising a plurality of fiber optic ports; wherein two of the plurality of fiber optic ports are configured to pass classified and unclassified data to one of a classified IP network and an unclassified IP network; and wherein the first switch is configured to operate in a plurality of states including secure, non-secure, and configuration/cut-off. The IP switching system also includes at least one controller connected to the coder/decoder via the first switch such that the at least one controller is accessible to the coder/decoder only when the first switch is in the configuration/cut-off state; wherein the at least one controller is configured to store and retrieve sensitive coder/decoder parameters for operation of the coder/decoder.

23 Claims, 5 Drawing Sheets

(56) References Cited

U.S. PATENT DOCUMENTS

| | | |
|---|---|---|
| 2009/0109959 A1 | 4/2009 | Elliott et al. |
| 2009/0157936 A1 | 6/2009 | Goss et al. |
| 2009/0251529 A1 | 10/2009 | Tucker et al. |
| 2009/0257588 A1 | 10/2009 | Ayaki et al. |
| 2010/0182395 A1 | 7/2010 | Delhoyo |
| 2010/0241748 A1 | 9/2010 | Ansari et al. |
| 2010/0271944 A1 | 10/2010 | Michaelis et al. |
| 2011/0035472 A1 | 2/2011 | Tucker et al. |
| 2011/0069144 A1 | 3/2011 | Tucker |
| 2011/0086614 A1 | 4/2011 | Brisebois et al. |
| 2011/0087879 A1 | 4/2011 | Chand et al. |
| 2011/0243329 A1 | 10/2011 | Staehly |
| 2011/0292206 A1 | 12/2011 | Newton |
| 2012/0147129 A1 * | 6/2012 | Tucker et al. .............. 348/14.08 |

OTHER PUBLICATIONS

Pan et al., "Advanced Opticaf-Label Routing System Supporting Multicast, Optical TTL, and Multimedia Applications". Journal of Lightwave Technology (IEEE), Oct. 2005.

* cited by examiner

INTERNET PROTOCOL SWITCHING SYSTEM AND ASSOCIATED METHOD OF USE

BACKGROUND OF THE INVENTION

Both private industry and Government agencies are migrating away from integrated services digital network (ISDN) technology at video teleconference (VTC) endpoints. ISDN is a set of communications standards for simultaneous digital transmission of voice, video, data, and other network services over the traditional circuits of the public switched telephone network. In the new communications environment, switching devices will be directed to connecting two or more Internet Protocol (IP) networks of varying security classifications. This new communication environment and associated switching system, particularly when used by the military, security, and intelligences services, requires extraordinary means to ensure communications security.

A number of Federal agencies are involved in certifying and validating hardware and software used in these communications systems so that such security can be ensured. Use of the Internet has compounded the difficulty in ensuring this security and has required rigorous testing regimes and complex designs for such communications systems. Further aggravating the security issue is the movement toward a converged communications system, which is one in which all video, data, and voice communications flow though a common (and digital) gateway. A common reference for such a converged communications system in U.S. military circles is a net-centric system, which is intended to support Network Centric Warfare ("NCW").

Part of a converged communications system involves Voice over Internet Protocol ("VoIP"), a technology that is a critical component of NCW, and is associated with potential command center desktop convergence, mobility enhancements, infrastructure reduction, and multi-media collaboration. Implementing VoIP is a critical step to effectively converge all communications traffic (data, voice, video, etc.) onto an IP network that is central to effective NCW.

Another type of switching system is disclosed in U.S. patent application Ser. No. 13/080,430, filed Apr. 5, 2011 that is U.S. Published Patent Application No. 2011/0243329, published Oct. 6, 2011, and U.S. Provisional Patent Application Ser. No. 61/321,313, filed Apr. 6, 2010, and entitled "Multi-Class Switching System and Associated Method of Use," the entire disclosures of which are incorporated herein by reference.

SUMMARY OF THE INVENTION

The present invention relates to a multi-class IP switching system that includes a coder/decoder configured for converting voice between analog and digital. The multi-class IP switching system also includes a first switch coupled to the coder/decoder configured to isolate non-secure entities in a network and comprising a plurality of fiber optic ports; wherein two of the plurality of fiber optic ports are configured to pass classified and unclassified data to one of a classified IP network and an unclassified IP network; and wherein the first switch is configured to operate in a plurality of states including secure, non-secure, and configuration/cut-off. There is at least one controller connected to the coder/decoder via the first switch such that the at least one controller is accessible to the coder/decoder only when the first switch is in the configuration/cut-off state. The at least one controller is configured to store and retrieve sensitive coder/decoder parameters for operation of the coder/decoder.

The present invention also relates to a multi-class IP switching system that includes a coder/decoder configured for converting voice between analog and digital. There is also a first switch coupled to the coder/decoder configured to isolate entities in a network, and which includes fiber optic ports configured to pass data to one of a plurality of IP networks. The first switch is configured to operate in a plurality of states including configuration/cut-off and two or more states each that allow data to be passed to one of the plurality of IP networks. The switching system further includes at least one controller connected to the coder/decoder via the first switch such that it is accessible to the coder/decoder only when the first switch is in the configuration/cut-off state. The at least one controller is configured to store and retrieve coder/decoder parameters for operation of the coder/decoder.

The present invention further relates to a multi-class IP switching system that includes a coder/decoder configured for converting voice between analog and digital. The switching system also includes a red fiber optic (F/O) switch coupled to the coder/decoder configured to isolate non-secure entities in a network and comprising fiber optic ports configured to pass classified and unclassified data to one of a classified IP network and an unclassified IP network. There are also media converters that are connected to the fiber optic ports of the red F/O switch configured to pass classified and unclassified data to the classified IP network and the unclassified IP network. There is further a router device coupled to the red F/O switch. The red F/O switch is configured to operate in a plurality of states including secure, non-secure, and configuration/cut-off. Moreover, the switching system includes a controller coupled to the router device such that the controller is accessible to the coder/decoder only when the red F/O switch is in the configuration/cut-off state and the classified and unclassified media converters are powered off. The controller includes (a) a state control module, (b) power-on/off logic, (c) network cut-off logic, and (d) remote control logic configured to control states of the red F/O switch and the router, and (e) storage that is configured to store and retrieve sensitive coder/decoder parameters for operation of the coder/decoder.

Moreover, the present invention relates to a method for utilizing an IP switching system that includes utilizing a coder/decoder for converting voice between analog and digital. The method also includes passing classified and unclassified data to one of a classified IP network and an unclassified IP network with a fiber optic (F/O) switch coupled to the coder/decoder to isolate non-secure entities in a network with fiber optic ports. The method further includes receiving secure data from the classified IP network and non-secure data from the unclassified IP network. The F/O switch operates in a plurality of states including secure, non-secure, and configuration/cut-off. The method yet further includes utilizing at least one controller to store and retrieve sensitive coder/decoder parameters for operation of the coder/decoder. The at least one controller includes a state control module, power-on/off logic, network cut-off logic, and remote control logic to control states of the F/O switch, and the at least one controller is connected to the F/O switch such that the at least one controller is accessible to the coder/decoder only when the F/O switch is in the configuration/cut-off state.

BRIEF DESCRIPTION OF THE DRAWINGS

In the drawings, which are not necessarily drawn to scale or with correct proportions, like numerals describe substantially similar components throughout the several views. The drawings illustrate generally, by way of example, but not by way of limitation, various embodiments discussed in the present document.

DETAILED DESCRIPTION OF THE INVENTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be used, or structural and logical changes may be made without departing from the scope of the present invention. The following detailed description is, therefore, not to be taken in a limiting sense, and the scope of the present invention is defined by the appended claims and their equivalents. In this document, the terms "a" or "an" are used to include one or more than one, and the term "or" is used to refer to a nonexclusive "or" unless otherwise indicated. In addition, it is to be understood that the phraseology or terminology employed herein and not otherwise defined, is for the purpose of description only and not of limitation.

Figure 1:
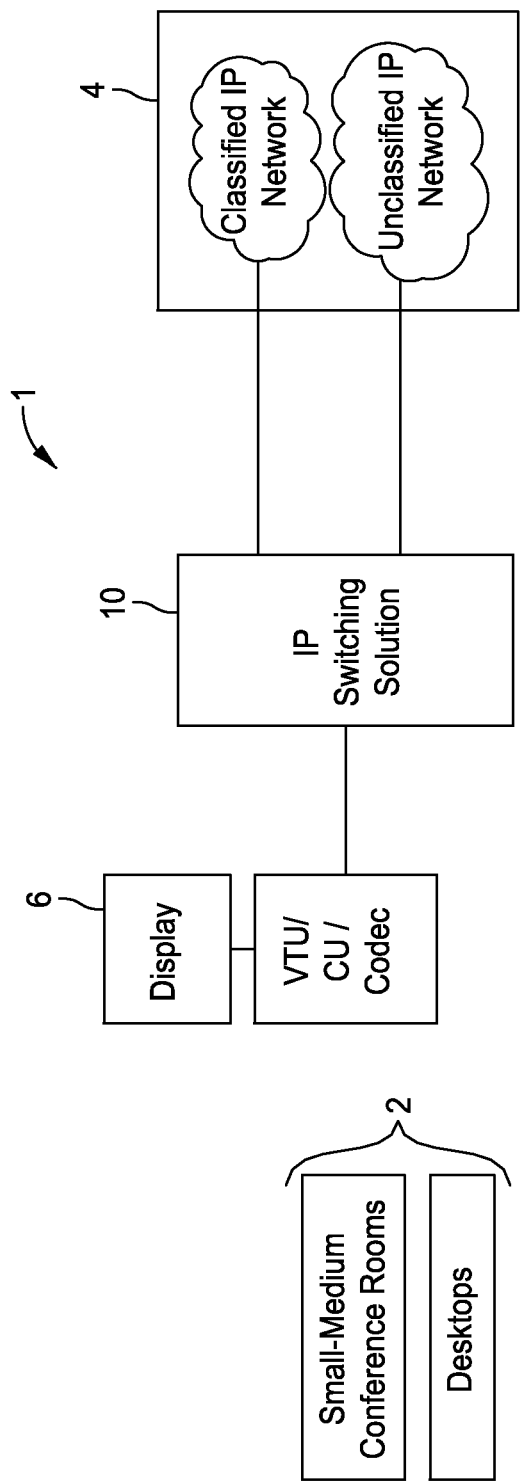
FIG. 1 illustrates a converged communication environment in which a multi-class internet protocol switching system is implemented.

FIG. 1 shows a converged communications environment 1 for controlling and enforcing security of certain communications over a number of networks. The environment includes a number of "rooms" 2 that may communicate through an exemplary internet protocol (IP) switching 60 to other entities using one or more notional domains or networks 4 (two are shown). Examples of the notional domains include unclassified NIPRNet and classified SIPRNet. The Secret Internet Protocol Router Network (SIPRNet) is a system of interconnected computer networks used by the U.S. Department of Defense (DoD) and the U.S. Department of State to transmit classified information (up to and including information classified SECRET) via the TCP/IP protocol suite in a secure environment. SIPRNet also provides services such as hypertext document access and electronic mail. SIPRNet provides a portion of the DoD's classified version of the public Internet. Additionally, its counterpart, the TOP SECRET and SCI Joint Worldwide Intelligence Communications System (JWICS) (not depicted) provides another portion of the DoD's classified version of the public Internet.

The Non-Classified Internet Protocol Router Network (NIPRNet) is used to exchange sensitive but unclassified information between "internal" users, as well as to provide users with access to the Internet. NIPRNet is composed of Internet Protocol routers owned by the DoD. NIPRNet is also referred to as the Unclassified but Sensitive Internet Protocol (IP) Router Network. NIPRNet was created by the Defense Information Systems Agency (DISA) to supersede earlier networks, including the MILNET (Military Network), which came from the Advanced Research Projects Agency Network (ARPANET). NIPRNet is, by design, a parallel air gapped analog to the SIPRNet, providing seamless interoperability for unclassified combat support applications, as well as providing a gateway to the public Internet.

An air gap is a security measure often taken for computers and computer networks that must be extraordinarily secure. The air gap ensures that a secure network is completely physically, electrically, and electromagnetically isolated from non-secure networks, such as the public Internet or a non-secure local area network. Limitations imposed on devices used in these environments may include a ban on wireless connections to or from the secure network or similar restrictions on electromagnetic leakage from the secure network through the use of TEMPEST or a Faraday cage. In environments where networks or devices are rated to handle different levels of classified information, the two (dis)-connected devices/networks are referred to as "low side" and "high side," in which "low" refers to unclassified and "high" refers to classified or classified at a higher level. This is also occasionally referred to as red or high (classified) and black or low (unclassified). To move data from the high (red) side to the low (black) side, it is necessary to write data to a physical medium and the data to a device on the latter network. Data can move from low-to-high with minimal processes while high-to-low requires much more stringent procedures to ensure protection of the data at a higher level of classification.

Each of the "rooms" 2 may include specific communications components or processes 6, including cameras, microphones, video teleconferencing units, conferencing units, displays, CODECS, DVD/VCR(s), Blu-Ray™ components, and touch screens(s) as illustrative, but nonlimiting, examples.

The converged communications environment 1 also may connect communications points (not shown), that are fixed or mobile, distributed or centralized. For example, the "room" 2 may be implemented in a self-propelled vehicle and may be used to communicate with other mobile assets and with fixed assets. The "room" 2 may communicate with other communications centers and communicate with, or control the communication to, from, and among less capable units, such as individual communications devices. Such individual communications devices include computers, telephones (fixed and mobile), radios, and any other type of communications device. The individual communications devices may be installed in any combination in one or more of the mobile and fixed assets.

The controlled communications include voice, voice over IP (VoIP), data, and video. The communications means include wired communications using fiber optic, cable, and copper wire. For example, the converged communications environment 1 may involve video conferencing among a number of distributed computers connected through a fiber optic network. The communications may be classified or unclassified, requiring a corresponding secure mode of communications and a corresponding non-secure mode of communications.

Within the converged communications environment 1, control of the communications, including communications security, is carried out by the internet protocol (IP) switching system 10. Internet protocol (IP) switching system 10 includes specific hardware devices, including switches, routers, modems, wiring, cabling, and other signaling means, decoders, controllers, processors, storage units and interfaces. The internet protocol (IP) switching system 10 also includes programming, embodied as software, hardware, or firmware, or any combination of software, hardware, or firmware, on one or more of the hardware devices or processors, as appropriate to support the functioning of the hardware devices.

Figure 2:
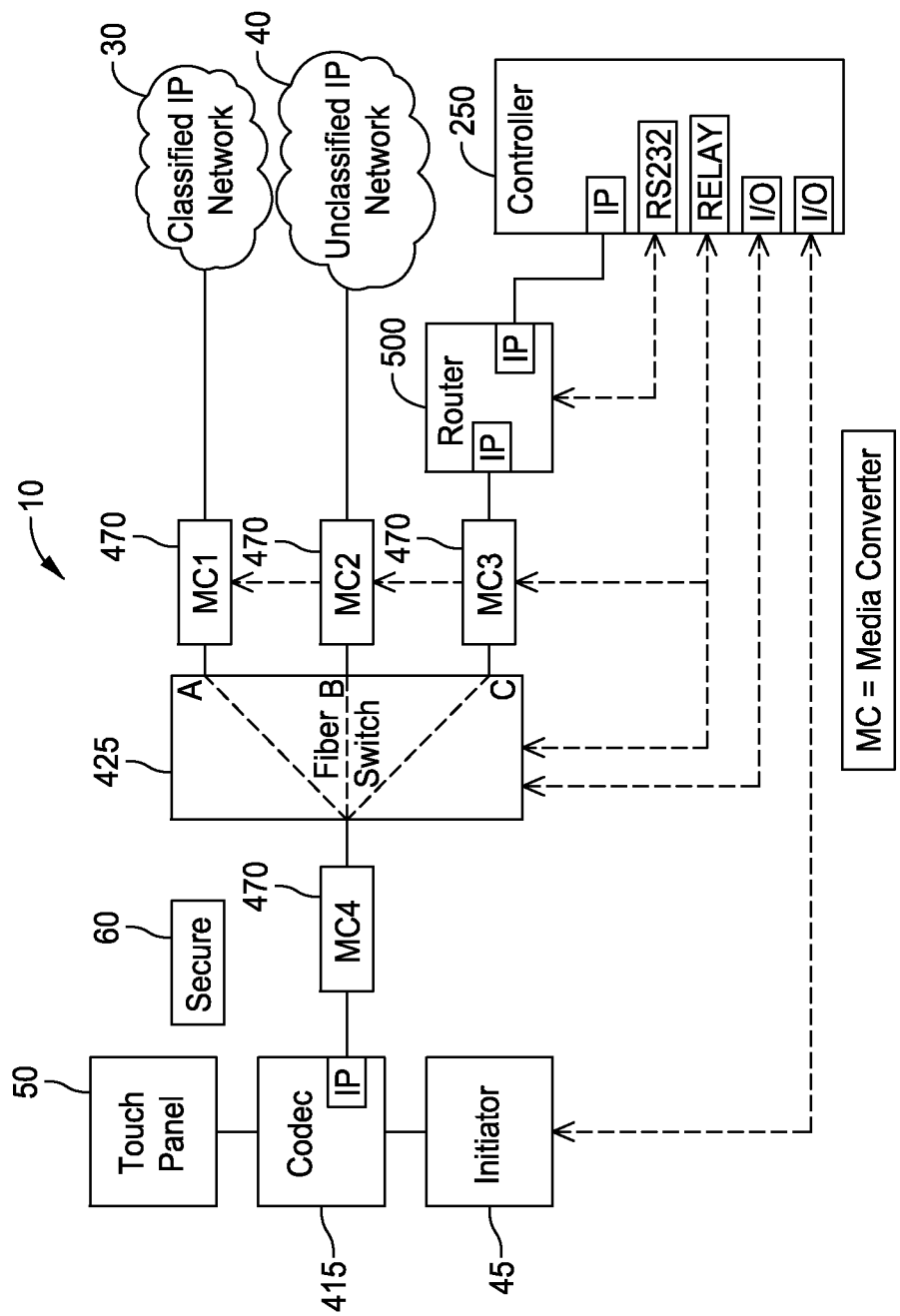
FIG. 2 and FIG. 3 illustrate in block diagram form, an exemplary multi-class internet protocol switching system installed in the converged communications environment of FIG. 1.
Figure 3:
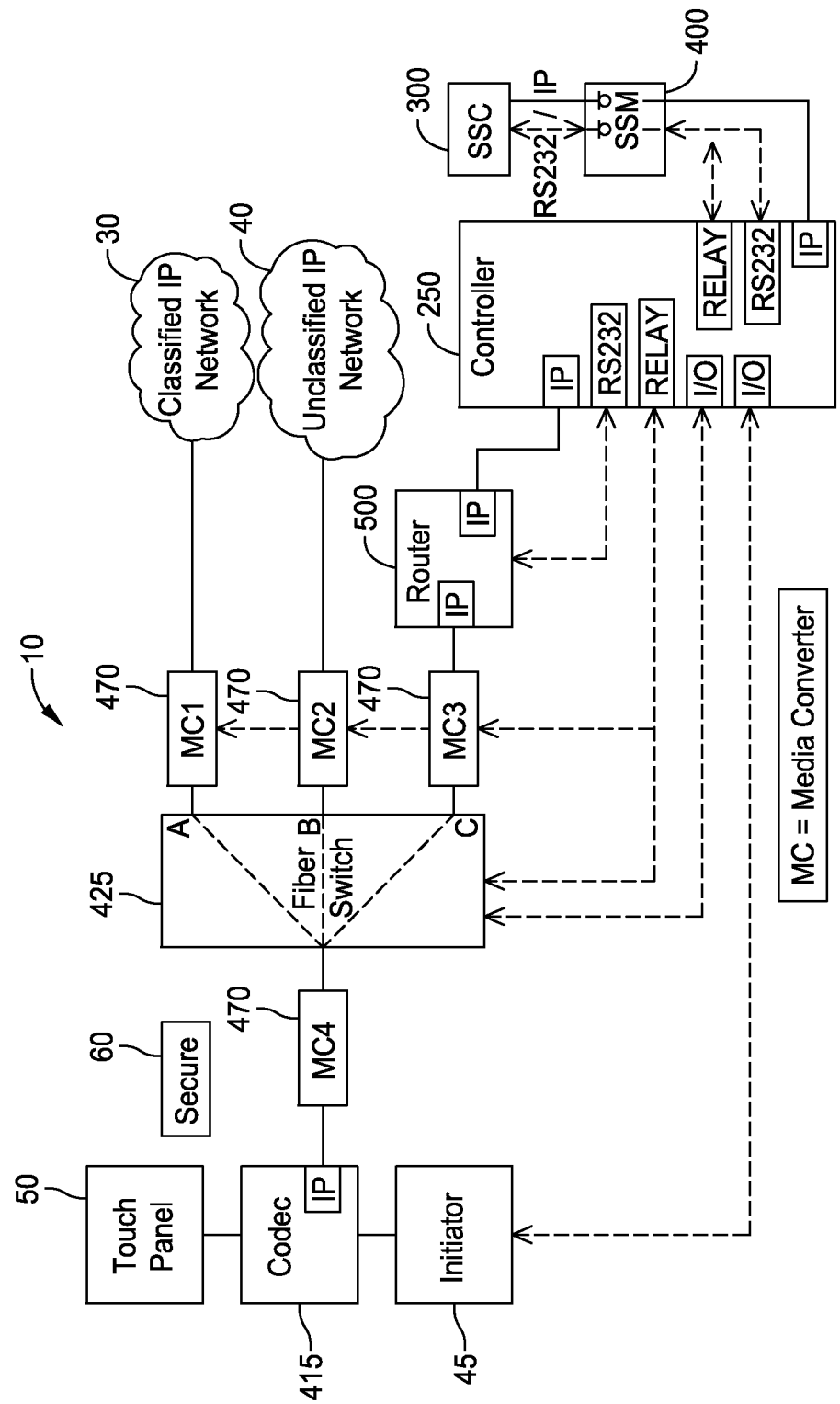

FIG. 2 and FIG. 3 are block diagrams of the exemplary internet protocol (IP) switching system 10 for use in the converged communications environment of FIG. 1. The internet protocol (IP) switching system 10 provides, among others, the following two primary features:

1. Secure IP telephony, supporting encrypted voice/IP data and video communications on the same terminal, and that preferably: (a) complies with NATO SCIP standards; (b) supports National and NATO encryption algorithms; (c) supports H.323 and SIP signaling protocols; (d) is compliant with COTS and NATO SCIP IP telephone systems; (e) is compliant with Network Centric Warfare Concepts; and (f) is compliant with TACOMS Post 2000 criteria.

2. Tactical IP Switches that: (a) are based on IP concepts; (b) support H.323, H.264 and SIP signaling protocols; (c) use F/O Gbit Ethernet Interface for the connection to other switches; (d) use 10/100 Base-T Ethernet interfaces to form high speed LANs; and (e) have H.323 Gatekeeper and SIP proxy server capabilities for management purposes of the Video and VoIP call control functions.

As can be seen in FIG. 2, internet protocol (IP) switching system 10 interfaces include a man-machine interface (touch panel 50), a signage panel 60, e.g., a LED/LCD display, interfaces, e.g., router 500, and other interfaces, all of which may be used to link to a number of different networks (or domains). The networks include classified IP network 30 and unclassified network 40. Other network types may be part of the converged communications environment 1 as shown in FIG. 1.

The switching components include a switch such as fiber optic (F/O) switch 425, storage controller 250, and router 500. The router 500 provides connectivity across domains, and preferably is a TCP/IP network router. The controller communicates with certain of the other internet protocol (IP) switching system 10 components utilizing IP protocols, for example. The switch could be a red switch. (Red and black are preferably used to refer respectively to secure and non-secure communications.)

The hardware devices illustrated in FIG. 2 may be rack-mounted in a single rack (not shown) or in multiple racks. The hardware devices may be electrically coupled for signaling purposes by wiring bundles or backplanes, or a combination of wiring bundles, cables, and backplanes. These coupling means may include shielding to eliminate the threat posed by EMI and to prevent possible "eavesdropping." These coupling means include fiber optic (F/O) cable as well as conventional copper wire or other means.

As can be appreciated from FIG. 2, the internet protocol (IP) switching system 10 can operate in a secure mode and a non-secure mode. The initiator 45 allows the users to change modes, and the touch panel 50 verifies the mode change (e.g., CLASSIFIED) for operation of the internet protocol (IP) switching system 10 and subsequent display mode on the signage panel 60. The signage panel 60 also may be used for other purposes, including display of a microphone (MIC) MUTE status.

The storage controller 250 also includes the hardware and programming (software and firmware) needed to invoke the various control functions available to a human user by way of the initiator 45 and touch panel 50. The storage controller 250 controls the I/O, RS-232 and relays for operating the internet protocol (IP) switching system 10 and for communications room operations. For example, the I/O connection between the initiator 45 and storage controller 250 is for communications control, and the relay connection between media converters 470 and storage controller 250 is to control power. As another example, the relay connection between the fiber optic (F/O) switch 425 and storage controller 250 is for communications control, and the I/O connection between the fiber optic (F/O) switch 425 and storage controller 250 is for status. As a further example, the RS232 connection between the router 500 and storage controller 250 is for communications control, and the IP connection between the router 500 and storage controller 250 is for data.

The storage controller 250 is also used for storing and retrieving sensitive CODEC parameters. Table 1 presents a nonexclusive listing of such CODEC parameters.

TABLE 1

CODEC PARAMETERS

| Parameter | Notes |
|---|---|
| DHCP/static | Defines whether to use DHCP or Static IP assignment. This configuration only applies to IPv4. |
| IP address | Defines the IPv4 IP address to use. Only applicable if Static IP assignment is being used. |
| IP subnet | Defines the subnet mask. Only applicable if Static IP assignment is being used. |
| IP gateway | Defines the IP gateway. Only applicable if Static IP assignment is being used. |
| IP DNS #1 | Defines the network addresses for DNS servers. Up to 5 addresses may be specified. |
| IP DNS #2 | Defines the network addresses for DNS servers. Up to 5 addresses may be specified. |
| External Services | Mode: <On/Off> Enables/disables External Services. External Services allows a third party integrator to present services on the unit using XHTML 1.0 strict and HTTP. If turned on, a menu choice will appear in the services menu, and entering this TANDBERG unit will retrieve a default XHTML page as specified in the External Services configuration menu. |
| External Services IP Address | Configures the External Services IP Address. |
| Corporate Directory | Mode: <On/Off> Enables/disables use of a Corporate Directory stored on a remote server. |
| Corporate Directory IP | Specifies the IP address to the server where the Corporate Directory is located. Example: xconfiguration corporatedirectory address: |

TABLE 1-continued

CODEC PARAMETERS

| Parameter | Notes |
|---|---|
| Address | 10.47.6.75 |
| H.323 Call Mode | Mode: <Direct/Gatekeeper/CallManager> Defines how to establish H.323 calls. Direct: An IP address must be used in order to make a H.323 call. The system will not use a gatekeeper or CallManager. Gatekeeper: The system will use a gatekeeper to make a H.323 call. CallManager: The system will use a CallManager to make a H.323 call. Direct H.323 calls can be made even though the H.323CallSetup Mode is set to Gatekeeper or Callmanager. Example: xConfiguration H.323 CallSetup Mode: Gatekeeper |
| Gatekeeper Mode | Discovery: <Manual/Auto> Auto: The system will automatically try to register to any available gatekeeper. If a gatekeeper responds to the request sent from the CODEC 415 within 30 seconds this specific gatekeeper will be used. This requires auto discovery on the gatekeeper as well. If no gatekeeper responds, the system will not use a gatekeeper for making H.323 calls and hence an IP address must be specified manually. Manual: The system will use a specific gatekeeper identified by H.323 Gatekeeper Address. Example: xconfiguration H.323 Gatekeeper discovery: manual |
| Gatekeeper IP Address | Specifies the IP Address of the Gatekeeper. |
| Call Manager IP Address | Specifies the IP Address of the Call Manager IP address. |
| Site ID | Defines Site ID. |
| E.164 alias | Defines e.164 alias. |
| SNMP mode | Mode: <On/Off/ReadOnly/TrapsOnly> Enables or disables SNMP service. If set to On, both Read and sending of Traps will be enabled. If set to Off, all SNMP functionality will be disabled. ReadOnly: The system will not send SNMP traps, but it will be possible to read data from the SNMP MIB. TrapsOnly: The system will send SNMP traps, but it will not be possible to read data from the SNMP MIB. Example: xconfiguration snmp mode: readonly |
| SNMP #1 IP address | Defines SNMP host addresses. Up to 3 addresses may be specified. Defines the network addresses for DNS servers. Example: xconfiguration snmp hostipaddr: |
| SNMP #2 IP address | Defines SNMP host addresses. Up to 3 addresses may be specified. Defines the network addresses for DNS servers. Example: xconfiguration snmp hostipaddr: |
| External Manager IP address | Specifies the IP address to the External Manager/Management system. |
| HTTP mode | Mode: <On/Off> Enables or disables HTTP service. |
| HTTPS mode | Mode: <On/Off> Enables or disables HTTPS service. |
| Telnet mode | Mode: <On/Off> Enables or disables Telnet service. |
| SSH mode | Mode: <On/Off> Enables or disables SSH service. |

Thus, the storage controller 250 stores IP addressing data and accesses the CODEC 415 to provide the IP addressing data for repopulating the CODEC 415 during a switch between secure and non-secure modes of the internet protocol (IP) switching system 10.

Moreover, access between the CODEC 415 and the storage controller 250 is allowed only when the fiber optic (F/O) switch 425 is set to configuration mode "C" and the media converters 470, e.g., MC1, MC2, MC3, are powered off. This access restriction, invoked by programming in the storage controller 250, e.g., the isolation module 330 shown in FIG. 4, prevents any portion of a non-secure network from contacting any portion of a secure network. That is, for example, when the fiber optic (F/O) switch 425 is set to the secure or non-secure mode and not the configuration mode "C," there will not be an electrical connection between the CODEC 415 and storage controller 250.

The storage controller 250 controls RS-232 communications between the storage controller 250 and the router 500 and power to the media converters 470. This communications path between the storage controller 250 and the router 500 is activated only when the internet protocol (IP) switching system 10 is in configuration mode and cut-off from both the classified IP network 30 and unclassified IP network 40 segments. Alternatively, the storage controller 250 could possibly be connected directly to the fiber optic (F/O) switch 425 or media converter, i.e., MC3, instead of through the router 500.

The fiber optic (F/O) switch 425, e.g., fiber optic switch, is a tri-channel fiber optic (F/O) switching unit that has three position states: SECURE (A) position, NON-SECURE (B) position, and CONFIGURATION/CUTOFF (C) position. The operational programming of the fiber optic (F/O) switch 425 may be specific per their environment and application. The fiber optic (F/O) switch 425 can be controlled by various means of actuation. The means of control include: manual control via front panel push button; contact closure control from a remote set of open/close contacts wired to the remote port of the fiber optic (F/O) switch 425 or initiator 45; and RS232 serial command controls as issued from a remote device capable of sending and receiving ASCII characters.

The fiber optic (F/O) switch 425 allows the user the capability of sharing a 10/100 Base-T device connected to the common port among three duplex ST (1300 nm wavelength)

Fiber Optic devices connected to SECURE, NON-SECURE, and CONFIGURATION Fiber Optic ports.

The Fiber Optic ports connect to media converters 470, and the output (i.e., the connection between the fiber optic (F/O) switch 425 and the CODEC 415) of the IP side of the media converters 470 is a copper Ethernet port connecting to the CODEC 415.

The fiber optic (F/O) switch 425 is controlled remotely using the control port located on the rear of the unit using contact closures. The housing for the fiber optic (F/O) switch 425 includes front panel LED displays that indicate the respective switch position and unit power status. All ports (A, B, and C) for the first switch, e.g., fiber switch 425, are transparent to all data going through that switch. In the event of a power failure, once power is restored to the system, the fiber optic (F/O) switch 425 will be connected to the configuration segment ("C") and cut-off from both the classified IP network 30 and unclassified IP network 40 segments.

FIG. 3 depicts an embodiment with further detail on the storage controller 250. In this embodiment, the secure storage controller (SSC) 300 contains the classified or sensitive information or CODEC parameters to reconfigure the CODEC 415. Thus, in FIG. 3, the secure storage controller (SSC) 300 stores IP addressing data and accesses the CODEC 415 to provide the IP addressing data for repopulating the CODEC 415 during a switch between secure and non-secure modes of the internet protocol (IP) switching system 10.

For example, IP addresses and address book entries are only connected to the CODEC 415 during the transition state where fiber optic (F/O) switch 425 is in configuration mode ("C"), and are disconnected at all other times. The secure switch manager (SSM) 400 controls RS-232 or IP communications between the storage controller 250 and the secure storage controller (SSC) 300 and power to the media converters 470. This communications path between the storage controller 250 and the secure storage controller (SSC) 300 is activated only when the internet protocol (IP) switching system 10 is in secure mode. During non-secure operations, e.g., whenever the VTC is configured for unclassified operation, the RS-232 or IP path between the storage controller 250 and secure storage controller (SSC) 300 is cut-off, for example, by air-gap control methods. The secure switch manager (SSM) 400 cuts-off communications to the secure storage controller (SSC) 300 in unclassified mode. The secure switch manager (SSM) 400 uses the necessary I/O, RS-232 and relays for communications to the storage controller 250. The RS-232 communications between the secure storage controller (SSC) 300 and the storage controller 250 are enabled only during secure operation and the transition state, i.e., configuration mode ("C"), to secure. The transition state to secure occurs only after both classified and unclassified communications are cut off from the fiber optic (F/O) switch 425, e.g., fiber optic switch, and media converters 470, i.e., MC1 and MC2, are powered down from all networks. Whenever the room is configured for unclassified operation, the RS-232 communications between the secure storage controller (SSC) 300 and the storage controller 250 are disengaged. The control from the storage controller 250 to the secure storage controller (SSC) 300 is not "hot" or available all of the time in its shared memory.

In an embodiment, the secure switch manager (SSM) 400 has a total of seven (7) isolated form "C" relay outputs (rated at 1 amp @ 120 VAC/28 VDC) that can be activated via positive (+) low current trigger inputs (rated at 3 to 24 VDC @ 2 mA minimum). When applied in two domain IP systems, three outputs will connect or disconnect the Tx, Rx, and Gnd RS-232 connectivity between the storage controller 250 and the secure storage controller (SSC) 300. Two outputs will cut power on or off to the non-secure and secure media converters 470, depending on the selected state.

The CODEC 415 may be implemented as software (i.e., a computer program), as hardware, or both. The CODEC 415 is capable of encoding and decoding a digital data stream or signal. The CODEC 415, as used in the internet protocol (IP) switching system 10, converts audio analog to digital (V.35-412) and computer digital sound back to audio.

The CODEC 415 receives IP addressing data from the secure storage controller (SSC) 300 during every change of state in the internet protocol (IP) switching system 10, and every mode change between secure and non-secure. The CODEC 415 then reboots, and the desired mode of operation is placed into effect.

Media converters 470 are coupled to the fiber optic (F/O) switch 425, as well as to each IP domain, i.e., the IP classified IP network 30 and unclassified IP network 40 in FIG. 2 and FIG. 3, and the router 500. In an embodiment, when a specific IP network or router 500 is not in use, power is removed from the associated media converter 470 by operation of the storage controller 250 and secure switch manager (SSM) 400. For example, media converter 470, i.e., MC1, will only be powered on when the fiber optic (F/O) switch 425 is set to secure or classified mode; media converter 470, i.e., MC2, is only powered on when the fiber optic (F/O) switch 425 is set to non-secure or unclassified mode; and media converter 470, i.e., MC3, is only powered on when fiber optic (F/O) switch 425 is set to configuration mode ("C"). In this scenario, media converter 470, i.e., MC4, will never be powered off.

Figure 4:
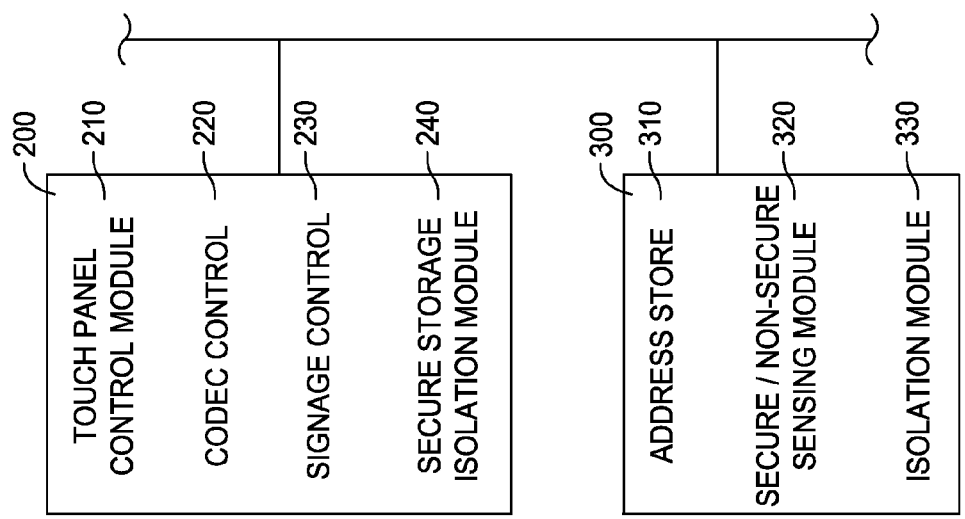
FIG. 4 is a block diagram illustrating various features of exemplary controllers used with the switching system of FIG. 2 and FIG. 3.

FIG. 4 is a block diagram illustrating various features of exemplary controllers, e.g., storage controller 250 and secure storage controller (SSC) 300, used with the internet protocol (IP) switching system 10. The storage controller 250 and secure storage controller (SSC) 300, as well as the secure switch manager (SSM) 400 (not shown in FIG. 4), may include programming on a single processor or multiple processors. Multiple processors may be installed in the same physical platform or in separate platforms. The programming may be software that is loaded into memory. Alternatively, some or all of the programming may be implemented in hardware. In FIG. 4, programming components of the storage controller 250 include the following modules: a touch panel control module 210 that implements the touch panel functionality, including communications between the touch panel 50 and other components of the switching internet protocol (IP) switching system 10; a CODEC control module 220 that controls operation of the CODEC 415; signage control module 230 that controls the display shown on signage panel 60; and secure storage isolation module 240 that works in conjunction with the secure storage controller (SSC) 300 to ensure that the address data retained in the secure storage controller (SSC) 300 is never accessible from an outside network.

The secure storage controller (SSC) 300 includes the following programming modules: an address store 310 that maintains a persistent store of IP address and other related information and that repopulates the CODEC 415 upon internet protocol (IP) switching system 10 reboot; a secure/non-secure sensing module that senses when the internet protocol (IP) switching system 10 is operating in a secure or non-secure mode and when power is lost to certain components, e.g., the fiber optic (F/O) switch 425, of the internet protocol (IP) switching system 10; and isolation module 330 that isolates the secure storage controller (SSC) 300 from other components of the internet protocol (IP) switching system 10 under defined operation conditions of the internet protocol (IP) switching system 10.

The storage controller 250 controls the transitioning of internet protocol (IP) switching system 10 components, including changes in software states, power on/off, and network connection/cut-off. For example, in order to securely transition the CODEC 415 from unclassified to classified use, the CODEC 415 is placed in a transition state where it disconnects from the network and all residual information is removed. The processes by which this is accomplished are called periods processing. For a single CODEC and shared peripherals on a classified CODEC, the audio/video media stream is classified information. Other information such as IP addresses, address book entries, call logs and call data records are sensitive information that may be considered classified.

Figure 5:
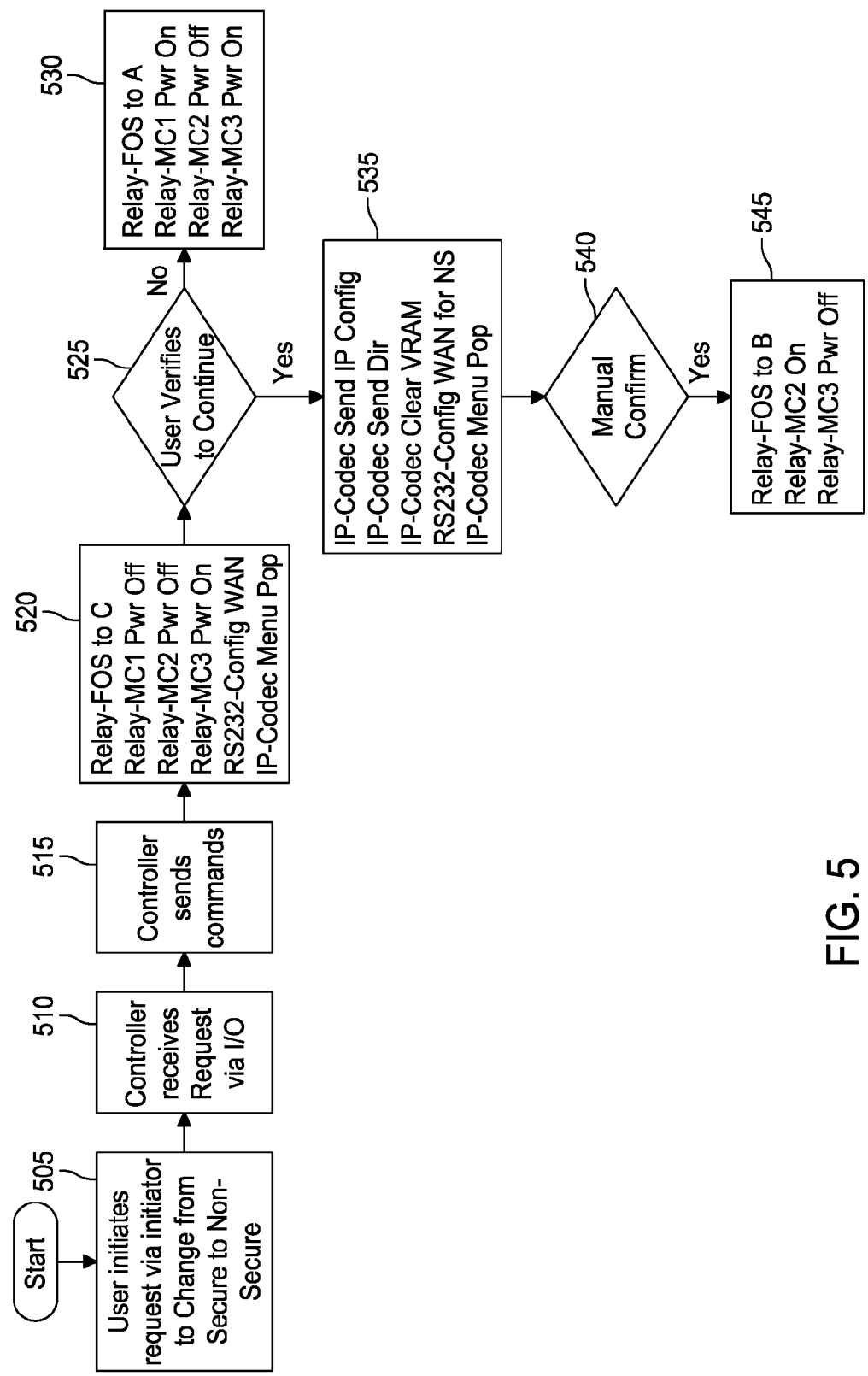
FIG. 5 is a flowchart illustrating exemplary operations of the switching system of FIG. 2 and FIG. 3.

Turning to FIG. 5, a flow diagram illustrates the process in a logic flow chart in an embodiment of the present invention with the functional explanation marked with numerals in angle brackets, <nnn>, will refer to the flowchart blocks bearing that number. For example, in step <505>, a user initiates a request via initiator 45 to change from secure to non-secure mode. At step <510>, the storage controller 250 receives this request via I/O. At step <515>, the storage controller 250 sends commands. As shown in <520>, the storage controller 250 sends the following commands: to change the fiber optic (F/O) switch 425 to configuration mode ("C") via the relay; for media controllers 470, i.e., MC1 and MC2, to power off via the relay; for media controller 470, i.e., MC3, to power on via the relay; to configure the non-secure network (e.g., wide-area network) via R232 connection; and to populate the CODEC via the IP connection. At step <525>, the user is asked to verify to continue. If the user selects "no," the controller at step <530> sends the following commands to put the system back into secure mode: to change the fiber optic (F/O) switch 425 to secure mode ("A") via relay; to power on media converter 470, i.e., MC1, via relay; to power off media converters 470, i.e., MC2 and MC3, via relay. If the user selected "yes," at step 525, the controller at step <535> sends the following commands: CODEC sends IP configurations via IP; CODEC send directories via IP; CODEC clear VRAM via IP; configures the network (e.g., WAN) for non-secure mode via R232 connection; and CODEC menu via IP connection. Next at step <540>, there is a manual confirm. If the user selects "yes," the controller sends the following commands at step <545>: to change the fiber optic (F/O) switch 425 to non-secure mode ("B") via relay; to power on media converter 470, i.e., MC2, via relay; and to power off media converter 470, i.e., MC3, via relay.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "have," "having," "includes" and "including" and similar terms as used in the foregoing specification are used in the sense of "optional" or "may include" and not as "required."

Many changes, modifications, variations and other uses and applications of the present construction will, however, become apparent to those skilled in the art after considering the specification and the accompanying drawings. For example, while embodiments are described using United States government IP networks, the present invention is not limited to such. The present invention could further be used by defense or government contractors, with military or government networks of other nations, and additionally for non-military/government networks in the private sector. For example, instead of a classified and unclassified network, the networks could be a connection to the internet and another secure network used for a company's trade secrets, research and development, or other sensitive corporate materials. Further, while two networks are described, the present invention is not limited to two and could include any number of such networks.

All such changes, modifications, variations and other uses and applications, which do not depart from the spirit and scope of the invention, are deemed to be covered by the invention, which is limited only by the claims that follow. It should be understood that the embodiments disclosed herein include any and all combinations of features described in any of the dependent claims.

The invention claimed is:

1. An internet protocol ("IP") switching system, comprising:
   a coder/decoder configured for converting voice, video or data between analog and digital;
   a fiber optic (F/O) switch coupled to the coder/decoder configured to isolate non-secure entities in a network and comprising a plurality of fiber optic ports; wherein two of the plurality of fiber optic ports are configured to pass classified and unclassified data to one of a classified IP network and an unclassified IP network; and wherein the fiber optic (F/O) switch is configured to operate in a plurality of states including secure, non-secure, and configuration/cut-off;
   at least one controller connected to the coder/decoder via the fiber optic (F/O) switch such that the at least one controller is accessible to the coder/decoder only when the fiber optic (F/O) switch is in the configuration/cut-off state; and wherein the at least one controller is configured to store and retrieve sensitive coder/decoder parameters for operation of the coder/decoder; and
   a router connected to the fiber optic (F/O) switch, wherein the fiber optic (F/O) switch is connected to the at least one controller and the router is configured to receive connection and data from the fiber optic (F/O) switch.

2. The IP switching system according to claim 1, wherein the at least one controller is connected to the coder/decoder via the fiber optic (F/O) switch through one of the plurality of fiber optic ports that is not configured to pass data to the classified IP network or the unclassified IP network.

3. The IP switching system according to claim 1, further comprising an initiator connected to the coder/decoder and connected to the controller.

4. The IP switching system according to claim 1, wherein the router is directly connected to the fiber optic (F/O) switch.

5. The IP switching system according to claim 1, wherein three of the plurality of fiber optic ports each correspond to one of the secure, non-secure, and configuration/cut-off states respectively.

6. The IP switching system according to claim 1, wherein the at least one controller includes a state control module, power-on/off logic, network cut-off logic, and remote control logic configured to control states of the fiber optic (F/O) switch.

7. The IP switching system according to claim 1, further comprising a plurality of media converters that are connected to the plurality of fiber optic ports of the fiber optic (F/O) switch.

8. The IP switching system according to claim 7, wherein the controller is accessible to the coder/decoder only when the fiber optic (F/O) switch is in the configuration/cut-off state and the media converters that are connected to the fiber optic ports configured to pass classified and unclassified data to the classified IP network and the unclassified IP network are powered off.

9. An internet protocol ("IP") switching system, comprising:
   a coder/decoder configured for converting voice, video or data between analog and digital;
   a fiber optic (F/O) switch coupled to the coder/decoder configured to isolate entities in a network and comprising fiber optic ports configured to pass data to one of a plurality of IP networks; wherein the fiber optic (F/O) switch is configured to operate in a plurality of states including configuration/cut-off and two or more states each that allow data to be passed to one of the plurality of IP networks;
   at least one controller connected to the coder/decoder via the fiber optic (F/O) switch such that it is accessible to the coder/decoder only when the fiber optic (F/O) switch is in the configuration/cut-off state; and wherein the at least one controller is configured to store and retrieve coder/decoder parameters for operation of the coder/decoder; and
   a router connected to the fiber optic (F/O) switch, wherein the fiber optic (F/O) switch is connected to the at least one controller and the router is configured to receive connection and data from the fiber optic (F/O) switch.

10. The IP switching system according to claim 9, wherein the at least one controller is connected to the coder/decoder via the fiber optic (F/O) switch through one of the plurality of fiber optic ports that is not configured to pass data to the plurality of IP networks.

11. The IP switching system according to claim 9, wherein the router is directly connected to the fiber optic (F/O) switch.

12. The IP switching system according to claim 9, wherein the plurality of fiber optic ports each correspond to one of the two or more states each that allow data to be passed to one of the plurality of IP networks, and the configuration/cut-off state.

13. The IP switching system according to claim 9, further comprising an initiator connected to the coder/decoder and connected to the controller.

14. The IP switching system according to claim 9, wherein the at least one controller includes a state control module, power-on/off logic, network cut-off logic, and remote control logic configured to control states of the fiber optic (F/O) switch.

15. The IP switching system according to claim 9, further comprising a plurality of media converters that are connected to the plurality of fiber optic ports of the fiber optic (F/O) switch.

16. The IP switching system according to claim 15, wherein the controller is accessible to the coder/decoder only when the fiber optic (F/O) switch is in the configuration/cut-off state and the media converters that are connected to fiber optic ports configured to pass data to the plurality of IP networks are powered off.

17. An IP switching system, comprising:
   a coder/decoder configured for converting voice, video or data between analog and digital;
   a red fiber optic (F/O) switch coupled to the coder/decoder configured to isolate non-secure entities in a network and comprising fiber optic ports configured to pass classified and unclassified data to one of a classified IP network and an unclassified IP network;
   media converters that are connected to the fiber optic ports of the red fiber optic (F/O) switch configured to pass classified and unclassified data to the classified IP network and the unclassified IP network;
   a router coupled to the red fiber optic (F/O) switch; wherein the red fiber optic (F/O) switch is configured to operate in a plurality of states including secure, non-secure, and configuration/cut-off;
   a controller coupled to the router device such that the controller is accessible to the coder/decoder only when the red fiber optic (F/O) switch is in the configuration/cut-off state and the classified and unclassified media converters are powered off, and further comprising:
   a state control module,
   power-on/off logic,
   network cut-off logic, and
   remote control logic configured to control states of the red fiber optic (F/O) switch and the router, and
   storage that is configured to store and retrieve sensitive coder/decoder parameters for operation of the coder/decoder.

18. The IP switching system according to claim 17, wherein the router device is coupled to the red fiber optic (F/O) switch through a media converter.

19. The IP switching system according to claim 17, wherein the red fiber optic (F/O) switch is coupled to the coder/decoder through a media converter.

20. The IP switching system according to claim 17, further comprising an initiator connected to the coder/decoder and connected to the controller.

21. A method for utilizing an IP switching system, comprising:
   utilizing a coder/decoder for converting voice, video or data between analog and digital;
   passing classified and unclassified data to one of a classified IP network and an unclassified IP network with a fiber optic (F/O) switch coupled to the coder/decoder to isolate non-secure entities in a network with fiber optic ports;
   receiving secure data from the classified IP network and non-secure data from the unclassified IP network; wherein the fiber optic (F/O) switch operates in a plurality of states including secure, non-secure, and configuration/cut-off;
   utilizing at least one controller to store and retrieve sensitive coder/decoder parameters for operation of the coder/decoder; wherein the at least one controller includes a state control module, power-on/off logic, network cut-off logic, and remote control logic to control states of the fiber optic (F/O) switch; and wherein the at least one controller is connected to the fiber optic (F/O) switch such that the at least one controller is accessible to the coder/decoder only when the fiber optic (F/O) switch is in the configuration/cut-off state; and
   utilizing a router to connect the at least one controller to the fiber optic (F/O) switch, wherein the router is configured to receive connection and data from the fiber optic (F/O) switch.

22. The method for utilizing an IP switching system according to claim 21, wherein media converters are connected to the fiber optic (F/O) switch to pass the classified and unclassified data to the classified IP network and the unclassified IP network; and
   wherein the at least one controller is connected to the fiber optic (F/O) switch such that the at least one controller is accessible to the coder/decoder only when the fiber optic (F/O) switch is in the configuration/cut-off state and the classified and unclassified media converters are powered off.

23. The method for utilizing an IP switching system according to claim 21, further comprising an initiator connected to the coder/decoder and connected to the controller.

\* \* \* \* \*

UNITED STATES PATENT AND TRADEMARK OFFICE
CERTIFICATE OF CORRECTION

| | |
|---|---|
| PATENT NO. | : 9,094,739 B2 |
| APPLICATION NO. | : 13/665544 |
| DATED | : July 28, 2015 |
| INVENTOR(S) | : Jeremy Edward Ousley, Bobbie Harman and Joseph Frederick Staehly |

It is certified that error appears in the above-identified patent and that said Letters Patent is hereby corrected as shown below:

On the title page item 73 Assignee should appear as follows:

UNICOM Government, Inc., Herndon, VA (US)

Signed and Sealed this
Thirteenth Day of October, 2015

Michelle K. Lee
*Director of the United States Patent and Trademark Office*